US006814104B2

(12) United States Patent
Dean

(10) Patent No.: US 6,814,104 B2
(45) Date of Patent: Nov. 9, 2004

(54) HYDRAULIC CONTROL VALVE, SYSTEM AND METHODS

(76) Inventor: James L. Dean, 5810 Walnutgate Dr., Spring, TX (US) 77373

( * ) Notice: Subject to any disclaimer, the term of this patent is extended or adjusted under 35 U.S.C. 154(b) by 0 days.

(21) Appl. No.: 10/382,254

(22) Filed: Mar. 5, 2003

(65) Prior Publication Data

US 2004/0173268 A1 Sep. 9, 2004

(51) Int. Cl.$^7$ ............................................. F15B 13/044
(52) U.S. Cl. ............. 137/625.65; 137/557; 137/596.17; 137/625.25
(58) Field of Search ........................... 137/557, 596.17, 137/625.25, 625.65

(56) References Cited

U.S. PATENT DOCUMENTS

| | | | |
|---|---|---|---|
| 910,163 A | 1/1909 | Benninghoff | |
| 2,063,655 A | 12/1936 | Barnes | |
| 2,291,563 A | 7/1942 | Ratler et al. | |
| 3,324,888 A | 6/1967 | Henderson | |
| 3,587,647 A | * 6/1971 | Walters | 137/625.25 |
| 3,917,220 A | * 11/1975 | Gilmore | 137/625.65 |
| 3,921,111 A | 11/1975 | Kowalski | |
| 4,088,152 A | 5/1978 | Baugh | |
| 4,467,833 A | 8/1984 | Satterwhite et al. | |
| 4,488,574 A | * 12/1984 | Bartholomaus | 137/625.65 |
| 4,493,335 A | 1/1985 | Watson | |
| 4,601,311 A | 7/1986 | Acker | |
| 4,793,591 A | * 12/1988 | Decker et al. | 137/625.25 |
| 4,856,557 A | * 8/1989 | Watson | 137/625.25 |
| 5,042,530 A | 8/1991 | Good et al. | |
| 5,236,017 A | * 8/1993 | Meyer et al. | 137/625.25 |
| 5,865,250 A | 2/1999 | Gariepy | |
| 6,041,804 A | 3/2000 | Chatufale | |
| 6,065,495 A | 5/2000 | Fong et al. | |
| 6,116,269 A | * 9/2000 | Maxson | 137/557 |
| 6,269,827 B1 | 8/2001 | Potter | |
| 6,390,117 B2 | 5/2002 | Zapf | |
| 6,474,359 B1 | 11/2002 | Smith | |
| 2001/0025662 A1 | 10/2001 | Kawamura | |

* cited by examiner

Primary Examiner—Gerald A. Michalsky
(74) Attorney, Agent, or Firm—Shawn Hunter

(57) ABSTRACT

A system, apparatus, and method of forming a hydraulic control valve system is provided. The system may include a hydraulic control valve, a removable mounting module, and a mounting assembly. The hydraulic control valve may have a valve body, the body having a function port, a supply port to allow for the supply of fluid to the function port, and a vent port to allow fluid to vent from the function port. The control valve may also have a gate assembly, the gate assembly having a gate, a seal assembly, and a roller bearings assembly. The seal assembly may include a seal carrier slidably mounted within the gate and a shear seal, to selectively direct hydraulic pressure to and from the subsea function. The hydraulic control valve may also include an actuation assembly for slidably moving the seal assembly, and a female coupling assembly integral with the hydraulic control valve body. The hydraulic control valve system may also include the removable hydraulic mounting module which includes may include the control valve, an input-output module to interface the module to the control valve actuation assembly, and the mounting module housing.

27 Claims, 7 Drawing Sheets

HYDRAULIC CONTROL VALVE, SYSTEM AND METHODS

FIELD OF THE INVENTION

The invention relates generally to control valves. In more specific aspects, the invention relates to: two-way three position type control valves which are particularly useful in remote locations where long signal lines are required, such as is the case with submerged christmas trees used with subsea oil production; and methods for assembling and using the control valves.

DESCRIPTION OF THE RELATED ART

Due to cost, most subsea oil and gas wells are produced to, and controlled from, an available offshore host facility. Rarely are new offshore structures constructed unless they are dedicated to several wells. Each well, in most cases, can be miles away from the facility. Control of the wells on such long offsets has been performed using several different methods: direct hydraulic, piloted hydraulic, direct electric, and multiplex electric, just to name a few. In the direct hydraulic method, valves, such as subsea tree valves, are controlled using individual pressurized conduits from the surface hydraulic power unit ("HPU"). This method can he used over a short offset but is prohibitive over a longer distance due to the slow response time to open or close a subsea valve. It is also typically limited to control only one or two wells due to the number of conduits required to control each tree. In the piloted hydraulic methodology, control valves are placed locally on the subsea tree and then pilot operated from the surface HPU as to direct a main hydraulic supply to the individual tree valve actuators. This method has a shorter response time due to the fact the hydraulic conduits from the host facility only need to actuate the smaller pilot valves and not the larger tree valves. Although operational distance has been increased using the "piloted hydraulic" method operation of more than a few wells, it is still prohibitive by the number and size of the pressure conduits required in the control link umbilical.

In the direct electric methodology, control valves are placed locally on the subsea tree which are then operated selectively using electrical power from the host facility. Individual conductor sets are dedicated to each valve. The subsea control valves can be operated selectively by a simple switch or Program Logic Controller ("PLC"). In addition the PLC can be mounted on and used for control of the HPU, thus increasing the system efficiency. The problem of extended distances are somewhat solved with this method. However, use of the direct electric methodology for more than a few wells is still prohibitive by the number and size of the electrical conductors required in the control link umbilical.

In the multiplex methodology, control valves are placed locally on the subsea tree then operated selectively using an electrical power and signal link from the host facility. The electrical power is sent to the valves, which are then selected for operation by a signal via modem. The number of pressured conduits and electrical conductors are greatly reduced in the control umbilical link to the subsea trees. Many aspects of distance and multi-well control are solved with this method. However, there still exists a need for a control valve system operated over long distances and placed locally, for example, on a subsea tree, operated selectively using electrical power from the host facility and which uses a minimal number of conduits and a minimal amount of power.

The electrically operated control valve may have several configurations depending upon the specific application. The following are a few examples of configurations that may be used. These include a "power on activated" methodology, a pulse activated methodology, and a failsafe methodology. In the power on activated methodology, the valve will remain open or activated as long as electrical power is applied to an electrical power actuator such as a solenoid coil. When the power is removed the valve will close or deactivate. In the pulse activated methodology, an electrical power pulse is applied to the solenoid and the valve remains in the activated position until the solenoid is pulsed again to close or deactivate. Constant electrical power is not required to maintain the valve in the activated position due to a mechanical or hydraulic detent which keeps the valve in the last position. In the fail-safe methodology, the valve is pulse activated and will remain open until the supply pressure drops below a specific value or the solenoid is pulsed again. This type of valve is typically used in conjunction with the pulse activated last position type valve as a fail safe measure. The failsafe portion of the valve is placed upstream of the pulse activating portion of the valve in order to cut off pressure to all functions and block the supply until reactivated. The fail-safe type valve is not usually configured with a coupler outlet interface because it only communicates via the supply line internal the valve module.

The electric power required to operate an electrically-powered actuator for a valve, such as a solenoid valve, is a function of the square of the force required and, therefore, any reduction in the force required to operate the valve will afford significant economics in both the construction and the operation of a solenoid actuated pilot valve. For example, if the force to operate a valve is cut in half, the power consumption is thereby reduced to one-fourth the original amount. A sizable savings by reducing the amount of power required to move a solenoid plunger, both from the standpoint of the cost of the initial installation, subsequent operating cost, and reduced heat build-up which provides for greater reliability. Recognized is the need for a control valve requiring minimal amount of electrical power to be actuated.

The state-of-the-art has found shear-type valves to be highly effective in controlling hydraulic functions such as functions on a sub sea tree. The typical shear-type valve will have at least two opposing shear seals communicating with each other through the gate. One will remain covering the supply port during actuation with the other shuttling from block to covering the function port. This allows the supply pressure to access the function upon actuation. On deactivation the supply pressure is again blocked with the function uncovered and venting inside the valve cavity and vent port. The inherent problem with this configuration is shear seal sliding friction which is induced by the hydraulic pressure. The shear seals must be relatively large in order to cover the supply port in both the actuated and inactivated position. The radial seal around the shear seal encircle a large area which is acted upon by the hydraulic pressure. The net result is high force generated on the shear seal face (multiplied by two) that can require high solenoid force to slide from one position to the other. Several solutions have been derived in the past to combat the result of high seal friction. One solution was to add secondary hydraulic pilots to each valve that move the gate from one position to the other. Another solution was to make the porting in the shear seals very small, so the overall net force on the face is manageable. Yet another solution was to incorporate a very large electrical coil to move the gate. And yet another solution, was a combination of some or all of the above. All of the noted solutions have their own inherent problems which for the most part increase the size and complexity of the whole subsea system, reduce or restrict the flow to the subsea function or both. Thus, there is a need for a compact, less complex, control valve requiring a minimal amount of power to be actuated.

A typical subsea control valve does not contain or have the means to connect directly to the function coupler mounted on a base structure, such as those on a sub sea tree. Typically, this entails using a separate male and female coupler. The associated female coupler is an independent component that is either mounted on the bottom of the removable module or assembled on to the valve using a treaded connection with an o-ring seal. The coupler serves only as a hydraulic connection with the mating male coupler on a module fixed base. These subsea hydraulic couplings are well known in the art. Typically, the couplings consist of a male end and a female end with sealed fluid passageways therebetween. The female coupler typically includes a cylindrical body with a relatively large diameter receiving chamber for slidably engaging the male coupler and a relatively small diameter longitudinal bore at the other end. The small bore facilitates connections to hydraulic lines, while the larger bore seals and slidingly engages the male coupler. The male coupler typically includes a cylindrical portion at one end having an outer diameter approximately equal to the diameter of the receiving chamber in the female coupler. The male coupler also typically includes a connection at its other end to facilitate connection to hydraulic lines. When the male coupler is inserted into the receiving chamber of the female coupler, fluid flow is established between the male and female couplers.

The typical coupling devices include the ability to arrest fluid flow when not in mutual contact. The male and female couplers typically include a poppet valve within a central bore of each coupler. Each poppet valve typically includes a conical valve seal which seats, in the closed position, against a valve seat in the bore of each coupler. The poppet valve is engaged by the opposing coupler's valve actuator and opens to allow fluid flow. The poppet valve closes to arrest fluid flow against a valve seat within the bore. Typically, the poppet valve is spring-biased to the closed position. The valve actuator typically includes a nose or stem extending from the apex of the valve seal along the longitudinal axis of the poppet valve. Engagement between the valve actuators of the male and female coupler's poppet valves forces each valve face away from the valve seat and into the open position for fluid flow between the couplers. Additional coupling devices typically, the male couplers and female couplers, are attached to opposing manifold plates, whereby in emergency situations, the manifold plate can be quickly separated from the sub sea function, a subsea tree, for example, disconnecting the male and female couplers. Having both male and female couplers as separate units adds to the complexity and size of the valve module. Recognized is that eliminating the need for hydraulic conduit or passageways from the valve to the hydraulic coupler can result in reduced costs and complexity, increased reliability because as many as two seals per circuit can be eliminated by combining the two components into one. There exists, therefore, the need for a coupling assembly integral or part of the control valve.

The typical subsea control valve arrangement includes some form of external valve packaging. The most prevalent packaging methodology includes, but is not limited to some basic options such as: the controlled environment, and the non-controlled environment. In the controlled environment, the valve is typically enclosed in a dielectric fluid filled chamber or module which is typically pressure compensated to mirror that of the surrounding sea water head. A typical subsea control valve is filly enclosed in this chamber and communicates hydraulically to the subsea function via conduit passages to an external mounted hydraulic coupler. The improved valve extends outward from the chamber to directly contact and communicate with the male couplers on the fixed base and will have an environmental seal to separate the chambered fluid from the sea water. It is common for both the hydraulic supply and vent to be routed to a manifold in this configuration. In the non-controlled environment, the valve housing is typically in direct contact with the sea water. The electronics are accessed using conductors placed in a fluid filled hose which in turn typically pressure compensates the electronics section of the valve. No chamber environment seal is required for this configuration. It is common to vent the hydraulic fluid inside the module in this configuration.

A typical control valve will also have an external port tapped into the function output where an independent pressure switch or pressure transmitter is installed at the module assembly. The switch or transmitter may also be threaded and sealed onto the function passage of a manifold between the valve and the output coupler. This configuration is adequate for a controlled environment as previously described; however, it is not adequate for the non-controlled environment where sea water is in direct contact with the module components. Because of the switch location, a second fluid filled hose must be used to protect all of the conductors, one for the solenoid coil, and one for the pressure switch or transmitter. In a module that contains several valves the complexity and cost of two fluid filled hoses per valve may be prohibitive. Recognized, therefore, is the need to place the pressure transmitter conductors coincident with the solenoid conductors. Correspondingly, recognized is the need to route all conductors through a single fitting and into a single pressure compensated, fluid filled hose to the module electrical interface.

SUMMARY OF THE INVENTION

In accordance with the invention, an embodiment of the present invention advantageously provides a control valve having a lower cost than valve typically used in oil and gas well control that can be tailored for any number of applications, and which reduces the subsea complexity of its implementation, thus making the system more reliable and user friendly. An embodiment of the present invention advantageously provides a hydraulic control valve having a valve body. The valve body has a function port which may fluidly interface with the hydraulic functions, a supply port to allow for the supply of fluid to the function port, and a vent port to allow fluid to vent from the function port. The hydraulic control valve also includes a valve actuation assembly. The valve actuation assembly includes a plunger for moving a gate assembly between an supply port blocked position and a vent port blocked position. The hydraulic control valve gate assembly includes a gate. The gate slidably interfaces with a seal assembly. The seal assembly includes a seal carrier slidably mounted within the gate and a shear seal to selectably direct hydraulic pressure to and from the subsea function by selectably alternating between a vent open-supply blocked position and a vent closed-supply unblocked position. The shear seal is slidably mounted within the seal carrier. In the preferred embodiment, the configuration may only include one shear seal for scaling of the supply port and the vent port. Using only one shear seal results in relatively low power requirements need to move the shear seal. The seal assembly may also include a seal carrier return spring. The seal carrier return spring connects between the seal carrier and the gate. The hydraulic control valve may also include a roller bearings assembly having roller bearing engagement plate and an array of roller bearings rollingly interfaced with the roller bearing engagement plate.

In an embodiment of the present invention, the hydraulic control valve may further include a valve actuation assembly housing enclosing the valve actuation assembly, a pressure housing enclosing the seal assembly and a spring housing enclosing a gate return spring assembly and a function coupler assembly. The hydraulic control valve further may include a hydraulic pressure coupling assembly having a seal disk hydraulically connected to hydraulic lines.

In an embodiment of the present invention, the hydraulic control valve may further include an internal valve cavity used as both a pressure and a vent chamber, depending upon the valve position. In an embodiment, the control valve may also include a pressure transmitter integral to the valve and in hydraulic communication with the internal valve cavity. In an embodiment, the hydraulic control valve includes a conductor aperture which allows conductors to exit the valve body, and a conductor arrangement wherein a position of the pressure transmitter allows for routing electrically conductive pressure transmitter conductors and electrically conductive actuating conductors through the same conductor aperture.

In an embodiment, the hydraulic control valve may further include a gate return spring assembly. The gate return spring assembly may include a gate return spring having a proximal and distal end, and a spring adapter. The gate return spring is connected to the spring housing on the distal end and the spring adapter is connected to the gate return spring, wherein the gate return spring assembly returns the gate to the vent open-supply blocked position when the actuating assembly is not energized.

In an embodiment, the hydraulic control valve may include a function coupler interface assembly integral with the control valve. The function coupler interface assembly may include a female mating hydraulic coupler assembly for matingly connecting with a male coupling associated with the fixed module base. Additionally, in a controlled environment embodiment, the hydraulic control valve further comprises an environmental scat positioned to seal between the spring housing and the mounting or manifold plate.

An embodiment of the present invention also advantageously provides a hydraulic control valve system, including a hydraulic control valve, a hydraulic removable mounting module, and a mounting assembly. The hydraulic control valve has a valve body, the body having a function port, a supply port to allow for the supply of fluid to the function port, and a vent port to allow fluid to vent from the function port. The control valve may also has a gate assembly, the gate assembly having a gate, a seal assembly, and a roller assembly including a roller bearing engagement plate and an array of roller bearings rollingly interfaced with the roller bearing engagement plate. The seal assembly may include a seal carrier slidably mounted within the gate and a shear seal, to selectively direct hydraulic pressure to and from the subsea function by selectively alternating between a vent open-supply blocked position and a vent closed-supply unblocked position. In the preferred embodiment, the configuration may only include one shear seal for sealing of the supply port and the vent port. The hydraulic control valve may also include an actuation assembly for slidably moving the seal assembly. In the preferred embodiment, the actuation assembly of the valves may include a solenoid assembly.

In the preferred embodiment, the control valve of the hydraulic control valve system may also include a female coupling assembly formed integral with the hydraulic control valve body. This arrangement advantageously reduces the complexity and size of the valve module by eliminating the need for a hydraulic conduit, or manifold, passages from the hydraulic control valve to the hydraulic coupler. Advantageously, the cost of the hydraulic control valve and female coupler can be reduced because they are one integral component. Advantageously, the hydraulic control valve system becomes more reliable because as many as two seals per circuit are eliminated by combining the two components. Additionally, this arrangement advantageously provides fluid pressure communication between the function output passage and the valve cavity. In the preferred embodiment, a pressure switch or transmitter may be made integral with the valve.

The hydraulic control valve system may also include the removable hydraulic mounting module. The mounting module includes the control valve, an input-output module to interface the module to the control valve actuation assembly, and the mounting module housing. In an embodiment, the input-output module may include a program logic controller to selectively control individual valve position. In the preferred embodiment, the mounting module housing may be filled with a dielectric fluid which is in fluid communication with a pressure transmitter chamber.

The hydraulic control valve system may also include the mounting assembly, either separate or as a part of the removable module. The mounting assembly may include a valve retainer for connecting the valve to the mounting module, and an engagement assembly. The engagement assembly connects the module to the fixed base having a function coupler. The engagement assembly may compensate for a separation force generated by supply pressure between the valve and the function coupler. In the preferred embodiment, the engagement assembly includes a latch assembly to releasably latch the removable hydraulic module to the fixed base.

In the preferred embodiment, the hydraulic control valve system may include a plurality of control valves placed in a pattern inside the mounting module housing as to connect them directly to the mating hydraulic couplers on the fixed base, without the need for an additional interface manifold. Correspondingly, in this embodiment, the fixed base side of the mounting module housing may have at least as many apertures, or bores, that allow the distal end of the control valve to protrude from, and be removably engaged with, the fixed base side of the mounting module housing. Additionally, the hydraulic control valve system configured in the control environment arrangement may include an environmental seal for each control valve to provide a seal interface between the control valve and the fixed base side of the mounting module housing. Note, in this embodiment, the fixed base includes an array of male couplers.

An embodiment of the present invention advantageously provides a method for assembling a hydraulic control valve. The method may include the steps of inserting a gate assembly through an open end of a pressure housing, and attaching a seal disk through an aperture, or bore, in the pressure housing to interface with a shear seal. In an embodiment, the gate assembly may include a roller bearing assembly, a gate, a seal carrier, a sealed carrier return spring connected between the gate, and a shear seal. In an embodiment, the method may include the steps of connecting a distal end of the pressure housing with the proximal end of the spring housing so as the gate assembly touchingly engages a spring adapter located within the spring housing. In an embodiment, the method further includes connecting a nonmagnetically responsive tube to the proximal end of the pressure housing, the tube guidingly supporting a solenoid plunger. In an embodiment, the method further includes connecting a solenoid housing to the proximal end of the pressure housing. In an embodiment, the method including connecting a pressure transducer and a pressure transducer cap to the proximal end of the nonmagnetic steel tube to allow a sealed exit for a pressure transducer conductor. An embodiment also includes connecting a proximal end of a spring housing to the distal end of the pressure housing.

A method for assembling a hydraulic control valve system, which includes a control valve having a distal end, includes the steps of providing a hydraulic control valve mounting module housing having at least one aperture, or bore, for receiving a hydraulic control valve body, inserting the distal end of the control valve through the at least one aperture; and connecting the valve retainer to secure the hydraulic control valve body to the module housing. The hydraulic control valve body may be adapted to receive a valve retainer, such as a nut or rim. The valve retainer is used to secure the hydraulic control valve to the control valve mounting module housing. In an embodiment, the valve retainer is threadedly secured to the gate return spring housing.

BRIEF DESCRIPTION OF THE DRAWINGS

So that the manner in which the features and advantages of the invention, as well as others which will become apparent, may be understood in more detail, more particular description of the invention briefly summarized above may be had by reference to the embodiments thereof which are illustrated in the appended drawings. It is to be noted, however, that the drawings illustrate only various embodiments of the invention and are therefore not to be considered limiting of the invention's scope as it may include other effective embodiments as well.

DESCRIPTION OF THE PREFERRED EMBODIMENTS

The present invention will now be described more fully hereinafter with reference to the accompanying drawings which illustrate preferred embodiments of the invention. This invention may, however, be embodied in many different forms and should not be construed as limited to the illustrated embodiments set forth herein. Rather, these embodiments are provided so that this disclosure will fully convey the scope of the invention to those skilled in the art. Like reference numbers refer to like elements throughout. The prime notation to reference numbers, if used, indicates similar elements in alternative embodiments.

Figure 1:
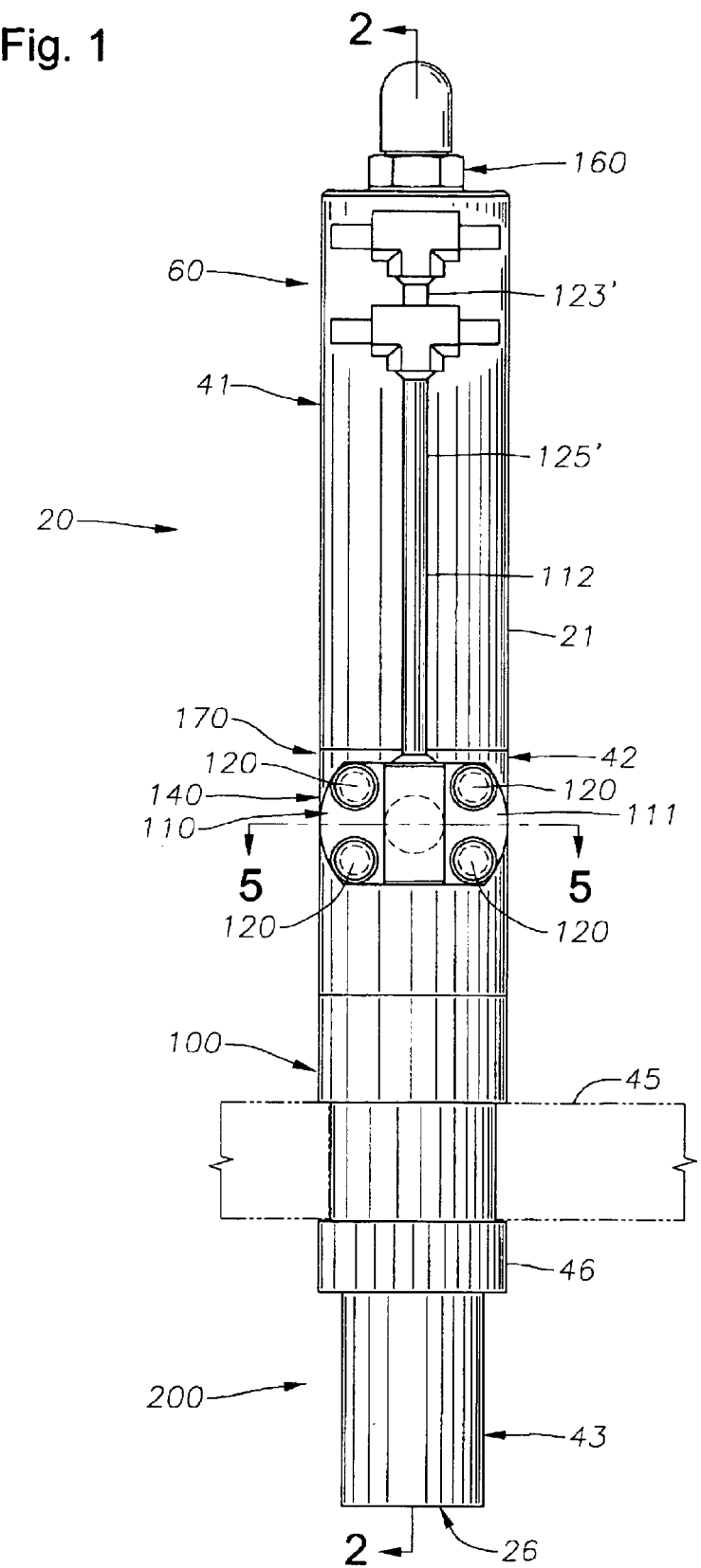
FIG. 1 is a partial cross-sectional view of a control valve according to an embodiment of the present invention.
Figure 2:
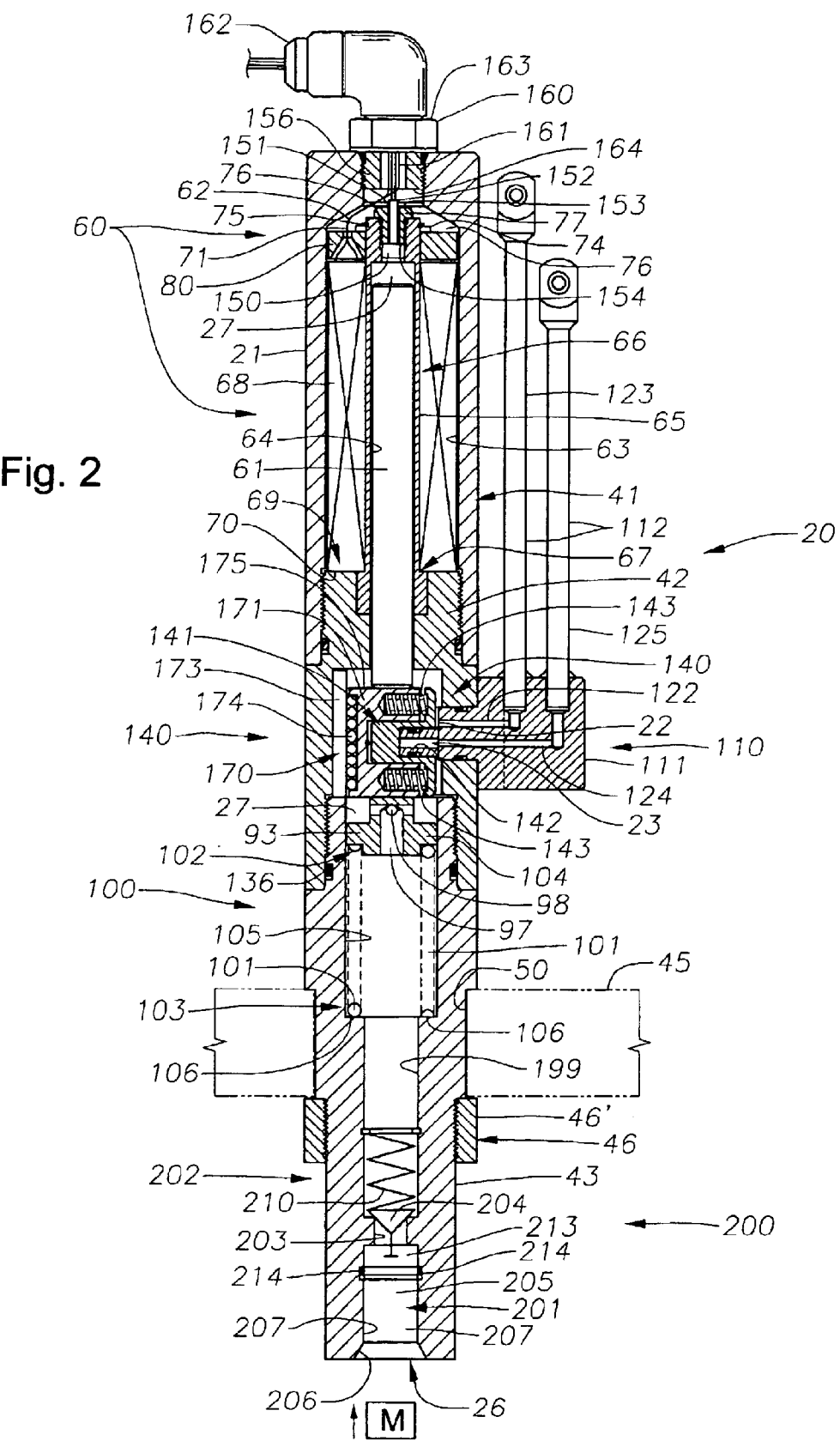
FIG. 2 is a partial cross-sectional view of a control valve according to an embodiment of the present invention taken along line 2—2 of FIG. 1.

As illustrated in FIGS. 1–5, an embodiment of the present invention advantageously provides a hydraulic control valve 20 having a valve body 21. As shown in FIGS. 1 and 2, the body 21 has a function port 26 which fluidly interfaces with the hydraulic functions, a supply port 22 to allow for the supply of fluid to the function port 26, and a vent port 23 to allow fluid to vent from the function port 26. The hydraulic control valve 20 also includes a valve actuation assembly 60. As best shown in FIGS. 4A and 4B, the valve actuation assembly 60 includes a plunger, or piston rod, 61 for moving a gate assembly 170 between a supply port blocked position as shown in FIG. 4A, and a vent port blocked position as shown in FIG. 4B. The hydraulic control valve gate assembly 170 includes a gate 171. The gate 171 slidably interfaces with a seal assembly 140. The seal assembly 140 includes a seal carrier 141 slidably mounted within the gate 171 and a shear seal 142 to selectively direct hydraulic pressure to and from a function, such as a subsea function, by selectively alternating between a vent port unblocked-supply blocked position as shown in FIG. 4A and a vent port blocked-supply unblocked position as shown in FIG. 4B. The shear seal 142 is slidably mounted within the seal carrier 141. In the preferred embodiment, the configuration only includes one shear seal 142 for sealing of the supply port 22 and the vent port 23. Using only one shear seal 142 results in relatively low power requirements needed to move the shear seal 142. The relatively low power requirements makes the control valve 20 particularly suitable for remote installation, for example on offshore submerged wellheads and the like.

Figure 4A:
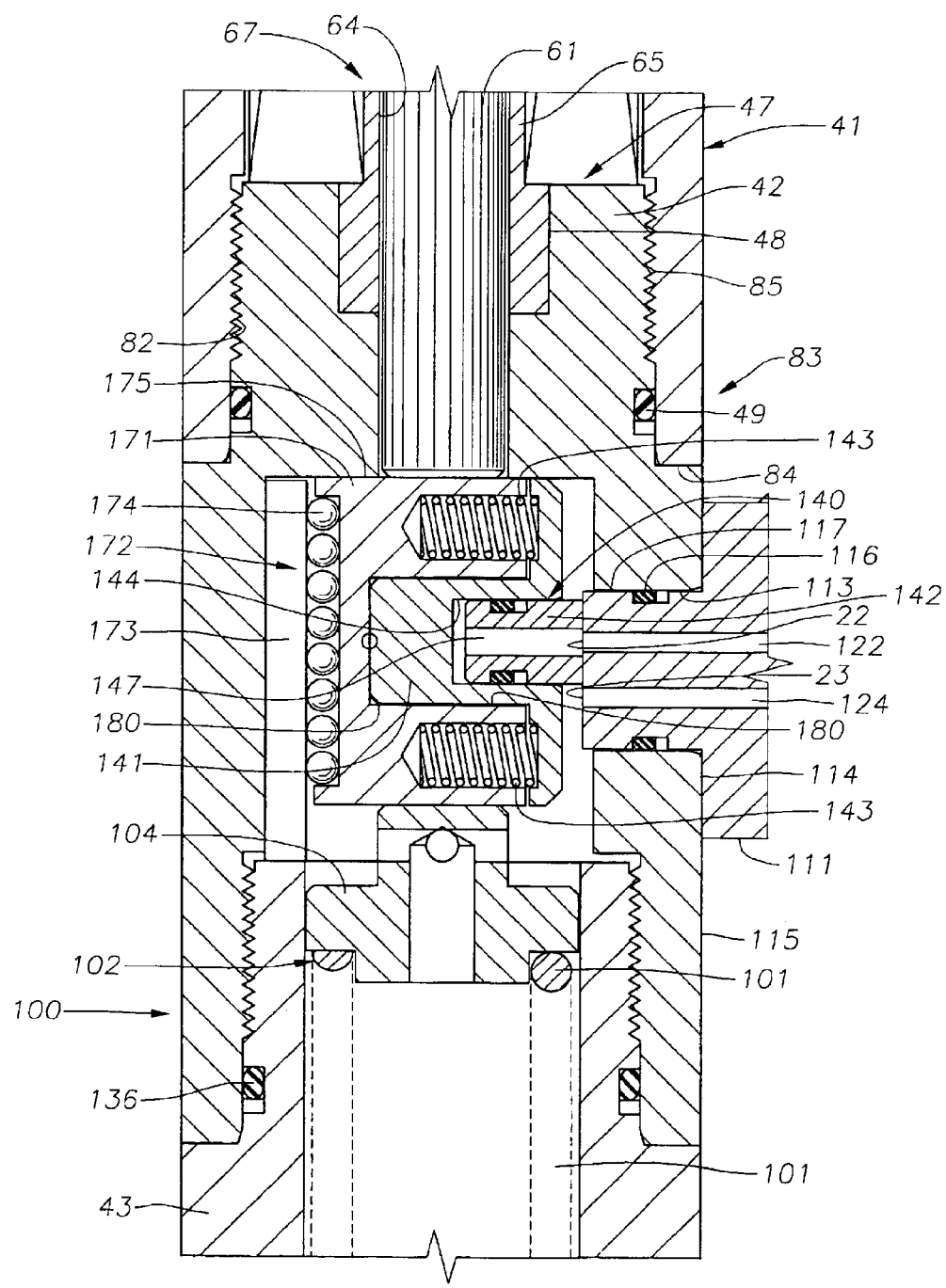
FIG. 4A is a partial cross-sectional view of the control valve depicting the vent closed-supply open shear seal position according to an embodiment of the present invention.
Figure 4B:
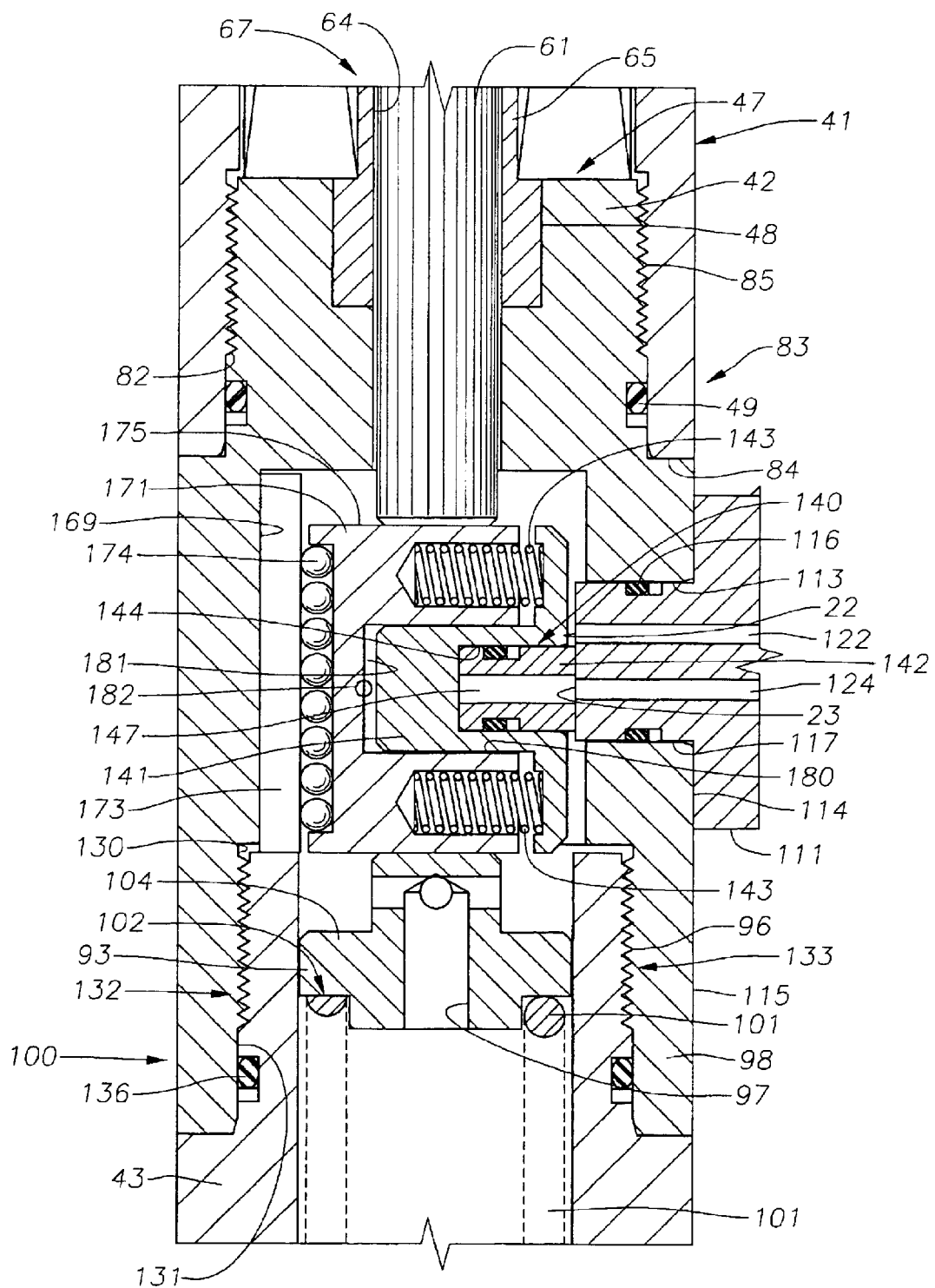
FIG. 4B is a partial cross-sectional view of the control valve depicting the vent closed-supply closed shear seal position according to an embodiment of the present invention.

Still with reference to FIGS. 2, 4A and 4B, the seal assembly 140 also includes at least one, and preferably two, seal carrier return springs 143. The seal carrier return springs 143, spring bias the seal carrier 141 with respect to the gate 171. The gate assembly 170 of the hydraulic control valve 20 also includes a roller bearings assembly 172 having a roller bearing engagement plate 173 and an array of roller bearings 174 in rolling contact, or interface, with the roller bearing engagement plate 173.

Figure 3:
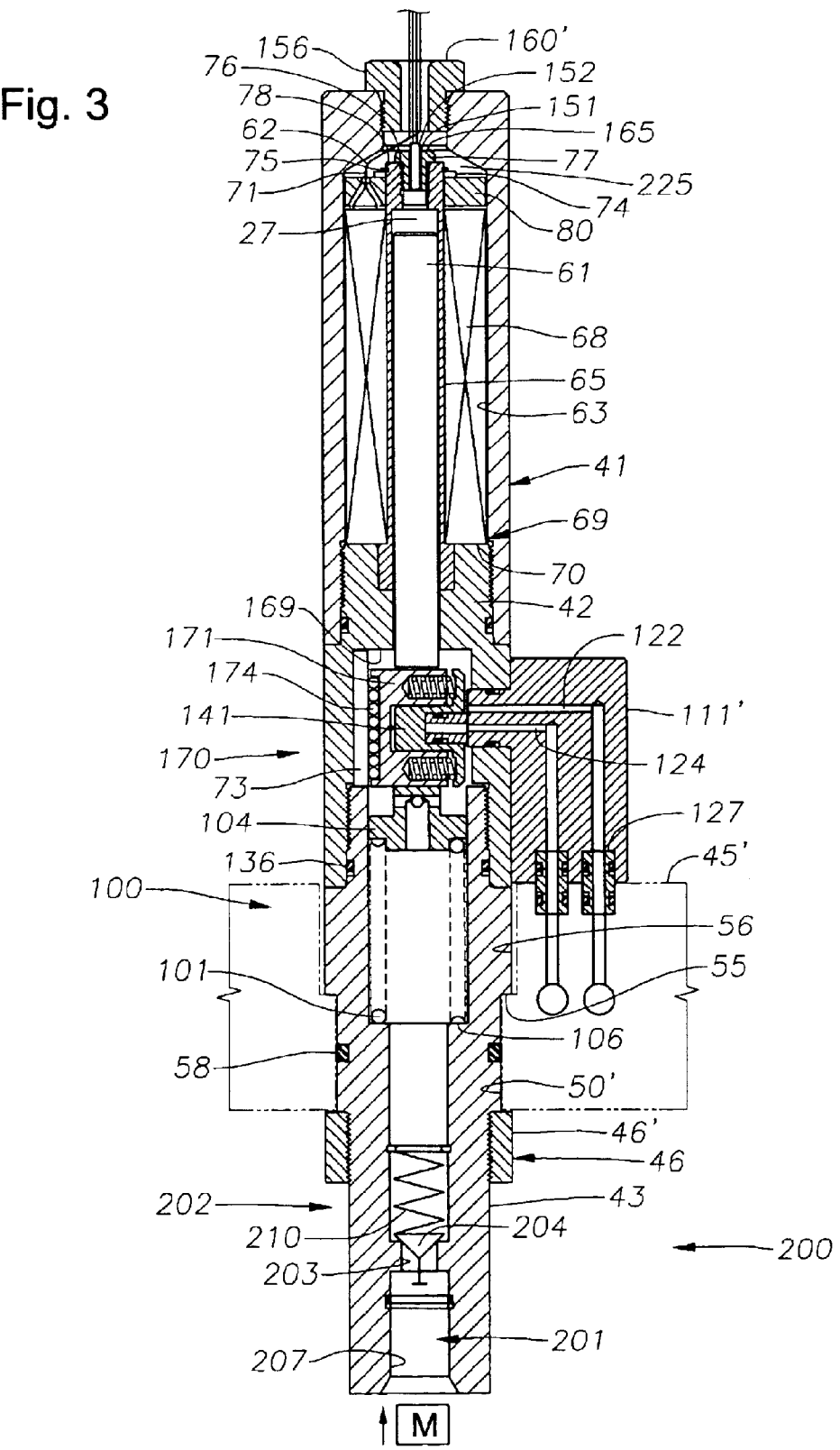
FIG. 3 is a partial cross-sectional view of a control valve according to an alternative embodiment of the present invention shown in FIG. 2.

In an embodiment of the present invention, the hydraulic control valve 20 further includes a valve actuation assembly housing 41 enclosing the valve actuation assembly 60, a pressure housing 42 enclosing the seal assembly 140; and a spring housing 43 enclosing a gate return spring assembly 100 and a function coupler interface assembly 200. As best shown in FIGS. 2–3, the hydraulic control valve 20 further includes a hydraulic pressure coupling assembly 110 having a seal disk 111 hydraulically connected to hydraulic lines 112.

In an embodiment of the present invention, the hydraulic control valve 20 further includes an internal valve cavity 27 used as both a pressure and a vent chamber, depending on the valve position. In an embodiment, the control valve 20 also includes a pressure switch, or transmitter, 150 integral to the valve and in hydraulic communication with the internal valve cavity 27. The hydraulic control valve 20 includes a conductor aperture 156 which allows conductors 62, 152 to exit the valve body, and a conductor arrangement wherein the position of the pressure transmitter allows for routing electrically conductive pressure switch, or transmitter, conductors 152 and electrically conductive actuating conductors 62 through the same conductor aperture 156. Due to the adjacent position of the coil and pressure switch or transmitter it is possible to gang both units to a single positive conductor with each retaining a separate negative conductor reducing the total conductor count from four (4) to three (3) minimum.

As best shown in FIGS. 2, 3, 4A and 4B, the hydraulic control valve 20 further includes a gate return spring assembly 100. The gate return spring assembly 100 includes a gate return spring 101 having a proximal end 102, a distal end 103, and a spring adapter 104. The gate return spring 101 is disposed in the spring housing 43, with the spring adapter 104 disposed on the-proximal end 102 of spring 101. The spring adapter 104 is upwardly biased by gate return spring 101, whereby the gate return spring assembly 100 returns the gate 171 to the vent open-supply blocked position as shown in FIG. 4A when the valve actuating assembly 60 is not energized, as shown in FIG. 4A.

Figure 6:
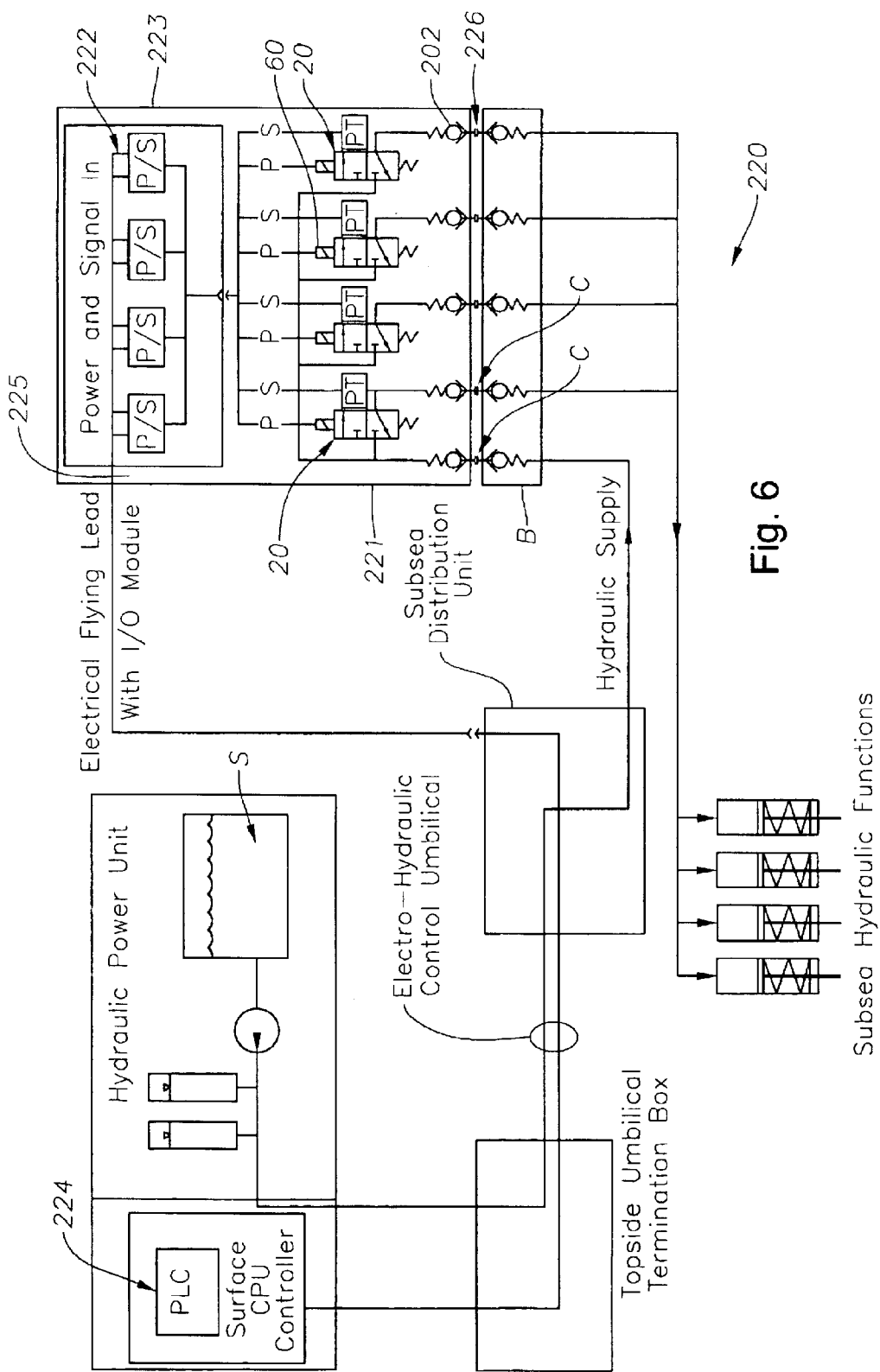
FIG. 6 is a schematic view of a control valve system according to an embodiment of the present invention.

As best shown in FIGS. 2–3, the hydraulic control valve 20 further includes the function coupler interface assembly 200 formed integral with the control valve 20. The function coupler interface assembly 200 includes a female mating hydraulic coupler assembly 201 for matingly connecting with a male coupling associated with the fixed module base B (FIG. 6). Additionally, in a controlled environment embodiment, the hydraulic control valve 20 further comprises an environmental seal 58 positioned to seal between the spring housing 43 and a mounting module or manifold 45. The hydraulic control valve 20 also further includes a valve retainer 46, (such as a retainer nut 46', ring or weld) for connecting the control valve 20 to the mounting module or manifold 45.

As best shown in FIGS. 2–4, the valve actuation assembly 60 is housed within a bore, or valve actuator chamber 63, of the valve actuation assembly housing 41. The valve actuation assembly 60 includes a plunger, or piston rod 61, for moving the gate assembly 170 between the supply port blocked position as shown in FIG. 4A to a vent port blocked position as shown in FIG. 4B, by engaging an upper surface, or end 175, of the gate assembly 170. In the preferred embodiment, the plunger, or piston rod 61, is slidably positioned within a bore, or plunger chamber 64 of a tube body 65 made of nonmagnetic material. The tube has a proximal end 66 and a distal end 67. In the preferred embodiment, the distal end 67 is welded to the proximal end 47 of the pressure housing 42, however, other engagement methodologies as known by those skilled in the art including, threading, are possible. In the preferred embodiment, the distal end 67 also lands within a proximal bore 48 of the pressure housing 42.

In the preferred embodiment, the valve actuation assembly 60 also includes a coil 68 located within the valve actuator chamber 63. The coil 68 surrounds the tube 65 in order to magnetically reposition the plunger, or piston rod 61, to its most distal position when the coil 68 is energized as shown in FIGS. 2 and 4B. The coil 68 preferably lands its distal end 69 upon an annular shoulder 70. In the preferred embodiment, the shoulder 70 is formed by the proximal face of the pressure housing 47. The coil 68 is further retained by an at least one retainer cover 80 preferably formed of a plastic material, although other suitable materials may be used. In the preferred embodiment, the retainer cover 80 has at least one, or as many as are desired, conduits 71 allowing coil actuating conductors 62 to pass through the retainer cover 80. In an embodiment, the retaining cover 80 and the proximal portion 66 of the tube 65, in a press fit with are fixedly secured via a bushing 74 and a retaining ring 75 preferably surrounding the outer circumference of the proximal end 66 of the tube 65 in a press fit with retaining cover 69.

As best shown in FIGS. 2–3, in the preferred embodiment, the proximal end 66 of the tube 65 includes a bore, or pressure transmitter chamber, 76 not necessarily the same diameter as the bore 64 surrounding the plunger or piston 61. This provides a proximal stop for the plunger or piston rod 61. The proximal end 66 of the tube 65, may be a unitary unit with the body of the tube 65 or may be a separate component. The proximal end 66 of the tube 65 engages a cap 77. In the preferred embodiment, the cap 77 is threadingly engaged with, and sealed to, the outer circumference of the pressure transmitter chamber 76 of the proximal end 66 of the tube 65. The cap 77 forms a seal, in this embodiment formed with a spot face O-ring 78, with the inner circumference of the proximal end 66 of the tube 65. Alternatively, the cap 77 may be threaded to the external portion of the tube 65 or welded on either internal or external portions. In an alternative embodiment, the cap 77 is in the form of an epoxy bead. In the preferred embodiment, a pressure switch, or transmitter 150, is located adjacent the distal portion 154 of the cap 77. The cap 77 includes a conduit 151 which allows the pressure switch or transmitter conductors 152 to pass through the cap 77. In the preferred embodiment, a small cavity 155 is formed between the pressure switch, or transmitter 150, and the proximal end 79 of the plunger or piston rod 61, when in its most proximal position. This allows improved hydraulic fluid flow to the proximal end 79 of the plunger or piston rod 61. Because the valve cavity 27 is integral to the function output passage 199, the pressure switch or transmitter 150 may be mounted as described above and provide accurate function pressure readings. The placement of the pressure switch or transmitter 150, as described, allows the pressure or transmitter conductors 152 to exit the hydraulic control valve 20 in the same area as the coil conductors 62. All conductors 62, 152, can be routed to a single conduit fitting 160, 160'. Local placement of the coil 68 and the pressure switch, or transmitter, 150 also allows the use of only three conductors, one positive and two negative, for operation of both units.

The conduit fitting 160, 160' engages a bore, aperture, or Fitting Chamber 156 located at the proximal end 81 of the valve actuator housing 41. In the preferred embodiment, the fitting is threadedly received and sealed within the conduit fitting chamber using a spot face O-ring 166. Alternatively, the fitting 160, 160' may be welded. Whether operating in a controlled or non-controlled environment, the preferred configuration of the conduit fitting 160, 160' includes a conduit 161 which allows the pressure switch or transmitter conductors 152 and coil conductors 62' to transmit between the proximal end 163 and distal end 164 of the fitting 160, 160'. As best shown in FIG. 3, in a controlled environment placement of the hydraulic control valve 20, the conduit fitting 160, 160' is preferably uncapped to allow for entry of fluid, for example dielectric fluid, into a chamber 165 formed between the distal portion 164 of the conduit fitting 160, 160' and the proximal portion 153 of the cap 77 and proximal portion 72 of the retainer cover 80. In a non-controlled environment for the placement of the hydraulic control valve 20, the conduit fitting 160, 160' is preferably capped. In this embodiment, the proximal end 163 of the fitting 160, 160' sealingly engages with a fluid filled hose (not shown).

As best shown in FIGS. 4A and 4B, the valve actuator housing 41 has a distal bore, or distal valve actuator housing bore 82. In the preferred embodiment, the inner circumference of the distal valve actuator housing bore 82 surrounds and preferably threadedly engages the outer circumference, or perimeter 85, of the proximal end 47 of the pressure housing 42. Also in the preferred embodiment, the most distal portion 83 of the valve actuator housing 41 lands on a shoulder 84 formed at the outermost proximal end of the pressure housing 42. Also in the preferred embodiment, the valve actuator housing 41 scalingly engages the pressure housing 42 via an O-ring seal 49 or other similar or suitable seal. In an alternative embodiment, the pressure housing 42 and valve actuator housing 41 may be welded, or otherwise attached, as known by those skilled in the art. Although the shape of the housings and assemblies are illustrated as being cylindrical or round, such structures may of course have any other desired cross-sectional configuration, such as square, hexagonal, etc.

Figure 5:
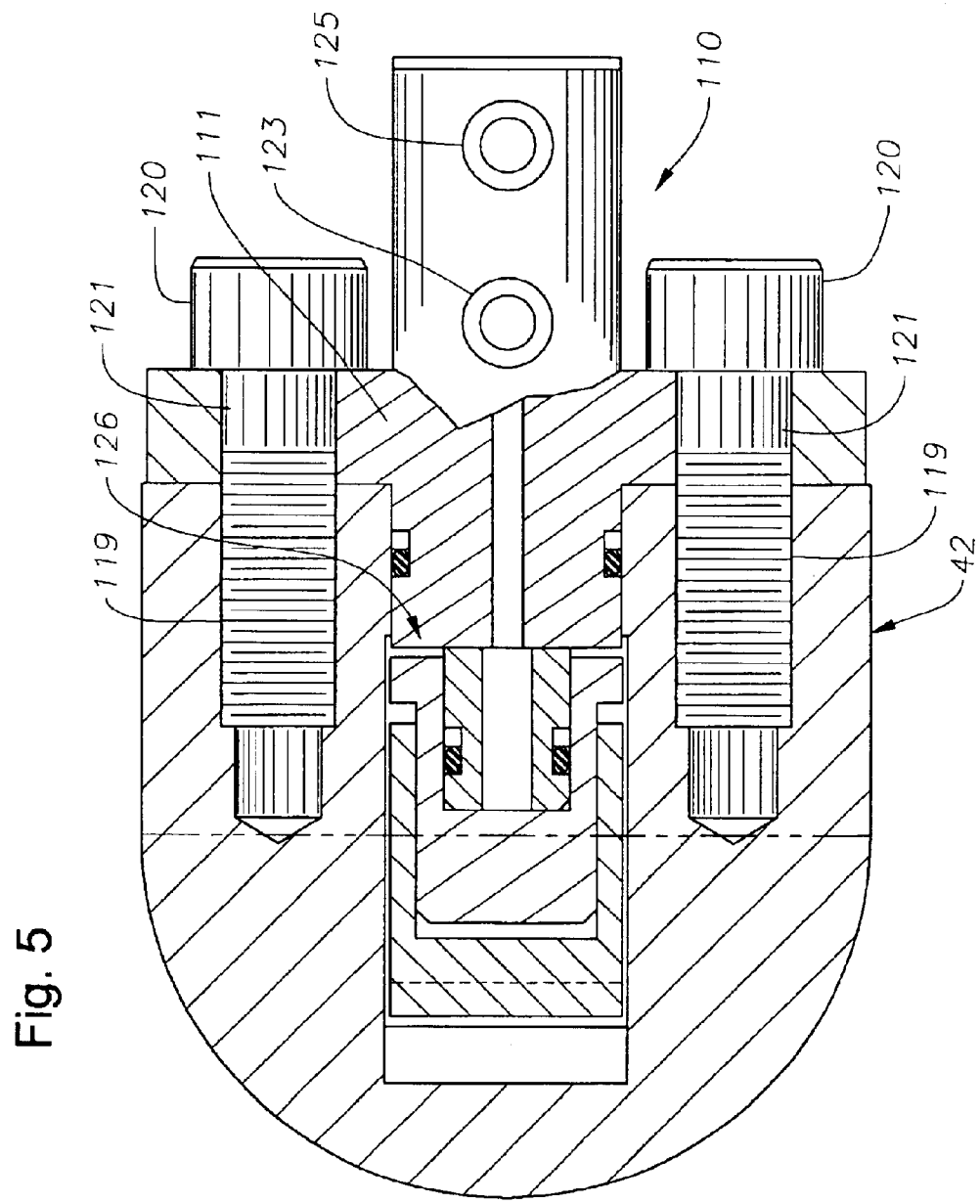
FIG. 5 is a partial cross-sectional view of the control valve according to an embodiment of the present invention taken along line 5—5 of FIG. 1.

As best shown in FIGS. 4A and 4B and 5, the pressure housing 42 includes a bore, or seal disk bore, 113, which sealingly receives a seal disk 111 of a hydraulic pressure coupling assembly 110. The seal disk 111 preferably has a shoulder 114 formed adjacent the seal carrier side of the disk which acts as a stop between itself and the outer surface 115 of the pressure housing 42, when the seal disk 111 is inserted into the seal disk bore 113. In the preferred embodiment, a radial seal 116 seals between the outer circumference 117 of the most seal carrier side of the seal disk 111 and the inner circumference 118 of the seal disk bore 113. As best shown in FIG. 5, in the preferred embodiment, the pressure housing 42 additionally includes an at least one bore 119, and preferably four bores 119, for receiving a corresponding screws, or bolts 120, to secure the seal disk 111 to the pressure housing 42. Correspondingly, the seal disk 111 has matching bores 121 for such purpose. As best shown in FIGS. 4A, 4B and 5, the seal disk 111 includes at least one bore, or cavity 122, hydraulically connected to a hydraulic supply line or manifold 123 (FIG. 2) and at least one bore or cavity 124 hydraulically connected to a hydraulic vent line or manifold 125 (FIG. 2). The seal carrier side 126 of the seal disk 111 includes supply and vent ports 22, 23. The seal carrier side 126 of the seal disk 111 and the supply and vent ports 22, 23, adjacent the seal carrier side 126 correspondingly interface with the shear seal 142 to preferably form a metallic seal.

As best shown in FIG. 2, in a non-controlled environment embodiment, the seal disk 111 also preferably includes a supply bore, or cavity 122, and a vent bore or cavity 124 which interfaces with a preferably external supply and vent lines 123, 125. As best shown in FIG. 3, in a controlled environment embodiment, the disk seal 111' also preferably includes a supply and vent bore or cavity 122, 124, which interfaces preferably with a manifold to allow the supply and venting of hydraulic fluid. In the preferred embodiment, the disk seal supply and vent bore, or cavity 122, 124, interface with the manifold using a seal sub 127.

The pressure housing 42 may have a distal bore, or distal pressure housing bore, 130 not necessarily having the same circumference as the bore 169 that houses the gate assembly, or gate assembly bore 169, hereinafter described. In the preferred embodiment, the inner surface 131 of the distal pressure housing bore 130 surrounds and threadedly engages the outer surface 132 of the proximal end 133 of the spring housing 43. Also in the preferred embodiment, the most distal portion 134 of the outer surface 132 of the pressure housing 42 lands on a shoulder 135 formed adjacent the proximal end 133 of the spring housing 43. Also in the preferred embodiment, the pressure housing 42 sealingly engages the spring housing 43 via an O-ring seal 136 or the like. In an alternative embodiment, the pressure housing 42 and spring housing 43 may be welded or otherwise attached as known by those skilled in the art As best shown in FIGS. 2, 3, 4A and 4B, in an embodiment, the hydraulic control valve 20 further includes a gate return spring assembly 100. The spring housing 43 includes a bore, or spring adapter bore 105 which houses the gate return spring 101 and the spring adapter 104, and provides a retraction point, thereof. The gate return spring 101 is disposed in the spring housing 43. In an embodiment, the spring housing 43 includes a bore, or function output passage 199, which interfaces with the spring adapter bore 105 and which allows passage of fluid to the function coupler interface assembly 200. In the preferred embodiment, the spring adapter bore 105 and the function output passage 199 are of differing sizes creating a shoulder 106 at the distal end 107 of the spring adapter bore 105 for landing the distal end 103 of the gate return spring 101. An alternative embodiment, however, allows for other means known by those skilled in the art to properly secure the gate return spring 101. The spring adapter 104 is connected to the proximal end 102 of the gate return spring 101, and utilized to reposition the gate 171.

With reference to FIGS. 4A and 4B, in the preferred embodiment, the outer perimeter, or circumference, 90 of the proximal end 91 of the spring adapter 104 is smaller than the outer perimeter or surface 92 of the body 93 of the spring adapter 104, resulting in a shoulder 94. Functionally, the gate return spring assembly 100 returns the gate assembly 170 to the vent open-supply blocked position as shown in FIG. 4A when the actuating assembly 60 is not energized. In an embodiment, the proximal end 95 of the spring adapter bore 105 has a smaller diameter than that of both the spring adapter bore 105 and the gate assembly bore 169. The smaller diameter of the proximal end 91 of the spring adapter 104 allows the proximal end 91 of the spring adapter 104 to penetrate into the gate assembly bore 169. As will be described later, in the preferred embodiment the spring housing 43 also provides a gate assembly stop 96 when the gate is in the actuated position as shown in FIG. 4B. Also in preferred embodiment, the spring adapter 104 includes a bore 97 hydraulically connected to a conduit 98 to increase hydraulic fluid flow into and out of the spring housing portion of the valve cavity 27.

Referring primarily to FIGS. 2 and 3, the hydraulic control valve 20 further includes a function coupler interface assembly 200 integral with the control valve 20. In the preferred embodiment, the function coupler interface assembly 200 is built into the spring housing 43. The function coupler 200 includes a female mating hydraulic coupler assembly 201 for matingly connecting with a male coupling associated with the fixed module base B. In the preferred embodiment, the hydraulic control valve 20 implements the function coupler 200 as one that is mechanically opened when in contact with the mating (male) coupler M. This check valve arrangement will limit sea water ingression during installation, or removal, of the valve 20 or valve package or module 221 (shown in FIG. 6). In the preferred embodiment, the function coupler 200 having check valve 202 is implemented as follows. The seal housing 43 includes a bore, or conical valve bore 203 used to interface with a conical valve seal 204, a bore, or male coupler bore 205, for receiving a male coupler M, and a conical shaped bore, or mating bore 206, at the distal end 28 of the spring housing 43 to help guide the male coupler M into the male coupler bore 205, all defining a "female" receiving chamber 207.

When the male coupler M is inserted into the receiving chamber 207 of the female coupler 201, fluid flow is established between the male and female couplers, M, 201.

The function output passage 199 includes a recess or attachment point 208 for the proximal end 209 of a conical valve spring 210. The conical valve spring 210 lands the conical valve seal 204 on a shoulder or otherwise engagement point 211 at the proximal end 212 of the conical valve bore 203, in the preferred embodiment, formed by the differential diameters between the functional output passage 199 and the conical valve bore 203. Thus, the conical valve 204 is spring-biased into the closed position, forming the check valve 202. The conical valve 204 preferably includes an extension 213 which allows the male coupler M to engage the conical valve 204, thus opening or uncapping the proximal end 212 of the conical valve bore 203. Additionally, in the preferred embodiment, the male coupler bore 205 includes a recess or a detent 214 which allows for a firm engagement between the male and female couplers M, 201.

As shown in FIGS. 4A and 4B, the pressure housing 42 includes a gate assembly bore 169. The gate assembly 170 includes a gate 171 which can be engaged by the plunger, or piston rod, 61 at its proximal end 175, and which can be engaged by the spring adapter 104 at its distal end 176. The gate 171 has a bore, or seal carrier bore 180, which slidably interfaces with the external surface of the seal carrier 141. The seal carrier 141 correspondingly has a bore, or shear seal bore 144, which, in essence, slidably interfaces with the external surface 145 of the shear seal 142. In the preferred embodiment, the configuration only includes one shear seal 142 for sealing of the supply port 22 and the vent port 23. A radial seal 146 is located between the external surface 145 (outer circumference) of the shear seal 142 and the shear seal bore 144 (inner circumference). The shear seal 142 acts as a cap that blocks the vent port 23 when the plunger or piston rod 61 (valve actuator) is in the actuated position and blocks the supply port 22 when the valve actuator 61 is in the non-actuated position. The shear seal 142 includes a bore, or fluid bore 147, which allows the supply fluid to pressurize the gate 171 and the shear seal 142 and radial seal 146. In the preferred embodiment, the seal assembly 140 also includes a plurality of seal carrier return springs 143. The seal carrier return springs 143 springingly connect between the seal carrier 141 and the gate 171. In the preferred embodiment, the gate 171 correspondingly includes a plurality of non-axial bores 177 which house the plurality of seal carrier return springs 143.

The seal assembly 140 has a seal disk side 178 and a side, or gate side, 179 opposite the seal disk. A cavity 181 exists between a portion of the gate 171 surrounding the seal carrier bore 180 and the gate side of the seal carrier 141. In the preferred embodiment a conduit 182 exists to increase hydraulic fluid flow into and out of the cavity 181. In the preferred embodiment, the seal carrier return springs 143 expand when the cavity 181 is being pressurized with supply pressure as when the supply port 22 is unblocked, and contract when the supply port 22 is blocked, retracting the seal carrier 141 and minimizing the size of the cavity 181. The seal carrier return springs 143 effectively maintain the gate assembly 170, and thus the roller bearings 174, in the proper position.

The hydraulic control valve also includes a roller bearing assembly 172 having a roller bearing engagement plate 173 and a plurality of roller bearings 174 roll against or which interface with, the roller bearing engagement plate 173. The roller bearings 134 and roller bearing engagement plate 173 are preferably located opposite the seal carrier side of the gate 171. The combination of the bearing 174 and plate 173 allow for smooth longitudinal movement of the gate assembly 170 between the supply open and the vent open positions as shown in FIGS. 4A and 4B. As noted, the proximal end 183 of the gate assembly bore 169 forms an upper stop 186 for the gate assembly 170. In the preferred embodiment, the proximal end of the spring housing 108 includes a protuberance 184 which acts as a lower stop 96 for the gate assembly 170. However, any methodology as known by those skilled in the art may be utilized in order to provide a gate assembly stop 96 at the distal end 185 of the gate assembly bore 169.

Functionally, when the valve actuation assembly 60 is energized, the plunger, or piston rod, 61 extends into the gate assembly 170 for moving the gate 171 until it contacts the lower stop 96. At this point, the shear seal 142 is blocking the vent port 23, and supply pressure will flood the interior of the valve 27 pressurizing the subsea function through the female-male coupler interface (female mating hydraulic coupler assembly 201). The shear seal 142 is aligned with the vent port 23, and supply pressure acting on the seal assembly 140 will force both the seal carrier 141 and the shear seal 142 against the seal disk 111 blocking the vent port 23. There is no pressure inside the shear seal 142 so the roller bearings 174 will only receive the force generated by the seal carrier return spring(s) 143.

Correspondingly, when the valve actuation assembly 60 is deenergized, e.g. electrical power removed from the coil 68, the gate return spring 101 will push the gate 171 back to the original position as shown in FIG. 4A. In this position, the gate 171 will contact the upper stop 186. At this point, the shear seal 142 is aligned with the supply port 22. The vent port 23 is now open and the supply port 22 is capped or closed by the shear seal 142. Function pressure will exit the valve 20 through the open vent port 23 and the associated header. In the preferred embodiment, the shear seal 142 also includes a fluid bore, or shear seal transfer channel, 147 preferably having a diameter larger than the diameter of the supply port 22. As shown in FIG. 4B, when the shear seal 142 is blocking the supply port 22, i.e., aligned with the supply port 22, supply port pressure is fed through the shear seal 142 activating the radial seal 146 between the seal carrier 141 and the shear seal 142. Pressure acting on the differential area between the face of the shear seal 142 and the radial seal 146 will contain or block the supply. The supply fluid pressure will form a fluid filled cavity 148 between the gate side of the shear seal 142 and shear seal carrier 141, thus loading the gate 171 back onto the opposing roller bearing assembly 172 and thus improving the seal performance.

A benefit for this configuration, using only one nominal size shear seal 142, is lower sliding friction. In the preferred embodiment, the shear seal face surface net area need not be any greater than approximately 0.075 square inches due to low friction resulting from using only one shear seal 142 The lower friction can then be translated into nominal porting size no greater than an approximately 0.0048 square inch area while still complying with MMS regulations, and nominal solenoid and gate return spring size and thus allow the use of higher working pressures equal to or exceeding 10,000 psi.

In an embodiment of the present invention, the hydraulic control valve 20 includes an internal valve cavity 27 used as both a pressure and a vent chamber, depending on the valve or gate assembly, 170 position. This configuration allows for the mounting of the pressure switch or transmitter 150 adjacent the proximal end 81 of the valve actuator housing 41. Functionally, the pressure switch or transmitter signal can be used to verify the control valve 20 has functioned properly and the desired subsea function has been activated. In an embodiment, the control valve 20 includes such pressure switch or transmitter 150 in hydraulic communication with the internal valve cavity 27, and also preferably placed adjacent the proximal end 81 of the valve actuator housing 41. The placement of the pressure switch or transmitter 150 in this location allows the conductors 152 to exit the control valve 20 in the same local area as the coil conductors 62. All conductors 62, 152, can be routed through a single fitting or aperture 156 and into a single pressure compensated, fluid filled hose (not shown) to the valve electrical interface or in the controlled environment mode, into a pressure compensated mounting module (schematically shown in FIG. 6).

As best shown in FIGS. 2–3, in an embodiment, the hydraulic control valve 20 includes a mounting assembly 40, whereby the control valve mounts either to a mounting plate or module 45 in conjunction with a valve retainer 46. The mounting plate 45 includes a bore, or mounting bore, 50 which provides a entryway, preferably slidable, for the control valve spring housing 43. Correspondingly, the hydraulic control valve 20 also further includes the valve retainer 46 (retainer nut, ring or weld) for connecting the control valve 20 to the mounting plate or module 45. In the preferred embodiment, the spring housing 43 threadedly interfaces with the valve retainer 46. The proximal side 51 of the valve retainer 46 removably engages with a distal side 54 of the mounting plate or module 45 depending on the environmental configuration. This arrangement forms a distal support for the hydraulic control valve 20. Also, in the preferred embodiment, the proximal side 53 of the mounting plate or module 45 engages a mid-section shoulder 55 of seal housing 43 which forms a proximal support. The combination of the two supports removably locking the hydraulic control valve 20 to the mounting plate 45.

In the controlled environment of FIG. 3, where the mounting assembly 40 includes a mounting manifold 45', the mounting manifold 45' preferably includes a distal bore 50' sized to receive the control valve outer spring housing 43 below the midsection shoulder 55, and a proximal bore 56 located on the same longitudinal axis as the distal bore 50' and sized to receive the control valve outer spring housing 43 above the midsection shoulder 55. The transition point between the proximal bore 56 and a distal bore 50' form a module mid-section shoulder 57. This arrangement forms a proximal support for the hydraulic control valve 20 between himself and the spring housing midsection shoulder 55. As in the non-controlled environment, the hydraulic control valve 20 also further includes a valve retainer 46 (retainer nut, ring or weld) for connecting the control valve 20 to the mounting manifold 45'. In the preferred embodiment, the spring housing 43 threadingly interfaces with the valve retainer 46. The proximal side 51 of the valve retainer 46 removably engages with a distal side 54' of the mounting manifold 45'. This arrangement forms a distal support for the hydraulic control valve 20. Also, as noted, the mounting manifold midsection shoulder 57 engages the spring housing mid-section shoulder 55 which form a proximal support. The combination of the two supports removably locking the hydraulic control valve 20 to the mounting module 45'. Additionally, in the controlled environment embodiment, the hydraulic control valve 20 further includes an environmental seal 58 positioned to seal between the spring housing 43 and the mounting plate or module 45'. In the preferred embodiment, this is accomplished between the proximal and distal supports.

As best shown in FIG. 6, an embodiment of the present invention also advantageously provides a hydraulic control valve system 220. The system 220 includes a hydraulic control valve 20, a removable mounting module 221, and a mounting assembly 40. As shown in FIGS. 1–3, the hydraulic control valve 20 has a valve body 21, the body 21 having a function port 26, a supply port 22 to allow for the supply of fluid to the function port 26, and a vent port 23 to allow fluid to vent from the function port 26. As shown in FIGS. 4A–B, the control valve 20 also has a gate assembly 170, the gate assembly 170 having a gate 171, a seal assembly 140, and a roller bearing assembly 172 including a roller bearing engagement plate 173 and an array of roller bearings 174 bearing against the roller bearing engagement plate 173. The seal assembly 140 includes a seal carrier 141 slidably mounted within the gate 171 and a shear seal 142, to selectively direct hydraulic pressure to and from the, e.g., subsea function by selectively alternating between a vent open-supply blocked position as shown in FIG. 4A and a vent closed-supply unblocked position as shown in FIG. 4B in the preferred embodiment, the configuration only includes one shear seal 142 for sealing of the supply port 22 and the vent port 23. Referring to FIGS. 2–3, the hydraulic control valve 20 also includes a valve actuation assembly 60 for slidably moving the seal assembly 140. In the preferred embodiment, the valve actuation assembly 60 is in the form of a solenoid assembly. In the preferred embodiment, the control valve 20 of the hydraulic control valve system 220 also includes a female coupling assembly 201 integral with the hydraulic control valve body 21. This arrangement advantageously provides fluid pressure communication between the function output passage 199 and the internal valve cavity 27. In the preferred embodiment, a pressure switch or transmitter 150 is made integral to the valve 20.

As best shown in FIG. 6, the hydraulic control valve system 220 also includes the removable hydraulic mounting module 221. The mounting module 221 includes a control valve 20, an input-output module 222 to interface the module 221 to the control valve actuation assembly 60, and a mounting module housing 223 to mount the control valve 20. In an embodiment, the input-output module 222 includes a program logic controller 224 to selectably control individual valve positions as shown in FIGS. 4A and 4B. Also referring to FIG. 3, in the preferred embodiment, the mounting module housing 223 is filled with a dielectric fluid 225 which is in fluid communication with the cavity 165 located between the conduit fitting 160, 160' and valve actuation assembly 60. In the typical application of the hydraulic control valve removable module 221, the input-output assembly 222 and the hydraulic supply and vent lines for the hydraulic mounting module 221 interface with a subsea distribution unit which interfaces with a surface controller and surface hydraulic power unit.

The hydraulic control valve system 220 also includes the mounting assembly 40, which may be formed either separate or part of the removable module. The mounting assembly 40 includes a valve retainer 46 (retainer nut or ring or weld) for connecting the valve 20 to the mounting module 221, and an engagement assembly 225. The engagement assembly 225 connects the module 221 to the fixed base B having a function coupler C. The engagement assembly 225 compensates for a separation force generated by supply pressure between valve 20 and the function coupler 200. In the preferred embodiment, the engagement assembly 225 includes a latch assembly 226 to releasably latch the removable hydraulic module 221 to the fixed base B.

In the preferred embodiment of the hydraulic control valve system 220, the control valve 20 is a plurality of control valves 20 placed in such a pattern inside the mounting module housing 223 as to connect directly to the mating hydraulic couplers C on the fixed base B, without the need for an additional interface manifold. Correspondingly, in this embodiment, the fixed base side of the mounting module housing 223 has at least as many apertures or bores 227, shown schematically in FIG. 6 that allow the distal end 28 of the control valve 20 to protrude and be removably engaged with the fixed base side of the mounting module housing 223. Additionally, the hydraulic control valve system 220 configured in the control environment arrangement includes environmental seal 58 for each control valve 20 to provide a seal interface between the control valve 20 and the fixed base side of the mounting module housing 223. Note, in this embodiment, the fixed base B includes an array of male couplers C.

An example operation for the hydraulic control valve system 220 in a power-on activated mode on a subsea platform is hereafter described. As shown in FIG. 6, the hydraulic control valve 20 is placed subsea and adjacent to, e.g., a production tree, and within a removable hydraulic mounting module 221 which is terminated to a fixed base structure B by means of a mechanical latch assembly 226. The removable hydraulic mounting module 221 may contain an input-output module 222 in the form of a one-atmosphere controller with modem or fiber optic signal interface depending on what type of control system is selected. Hydraulic supply S may feed into the module through hydraulic couplers C, shown schematically, located in the base B and the hydraulic valve including female coupler assembly 20 located the module shown schematically in FIG. 6. The coupler connection is made automatically upon the installation of the removable hydraulic mounting module 221. The supply is then routed to a bank (plurality) of hydraulic control valves 20 which are dedicated to operate an associated subsea function. Upon initiation of a signal from for example, the surface, the selected control valve 20 is actuated directing hydraulic supply pressure to the desired subsea function such as a tree gate valve. The control valve can then be deactivated which, in turn, will vent and close/deactivate the associated subsea function.

The hydraulic control valve 20 is placed inside the module housing 223 in a position to connect directly to the mating hydraulic coupler B on the fixed base B. The separation force generated by supply pressure between the valve 20 and the male coupler B is negated by the engagement assembly 225, typically a latch assembly 226, that holds the removable hydraulic mounting module 221 to the fixed base B. Also referring to FIGS. 2–3, the valve 20 is retained in position on mounting portion of the mounting module 221 by a valve retainer 46, typically a retainer ring or nut, which is thread onto the spring housing 43. The valve retainer 46 will combat the separation force induced by the hydraulic connection area and also allow the valve 20 to be removed from the inside of the mounting module 221, facilitating any wiring harness and hydraulic connections.

Also referring to FIGS. 4A and 4B, supply pressure is feed to the hydraulic control valve 20 via a seal disk 111' which also routes the vented pressure from the valve 20. In an embodiment where the valve actuation assembly 60 is in the form of a solenoid assembly, electric power is routed to the coil 68 from the input-output module 222, typically a CPU I/O Block or electrical interface depending on the control system type selected by the user. Once the signal to the input-output module 222 is received by the module 221, power is switched to the desired control valve 20 energizing the 68 coil. The coil 68 generates a magnetic field which moves the plunger or piston rod 61, thus pushing the gate 171 to the activated, vent blocked-supply open position as shown in FIG. 4B. The gate 171 will stop on the valve spring housing 43 aligning the shear seal 142 with the vent port 23. In this position the supply port 22 is open and the vent port 23 is capped or closed by the shear seal 142. Supply pressure will flood the interior of the valve (internal valve cavity 27) pressurizing the subsea function through the function coupler interface assembly 200. When the control valve 20 is to be closed, the electrical power is removed from the coil 68 thus allowing the gate return spring 101 to push the gate assembly 170 back to the default, vent open-supply blocked position as shown in FIG. 4A. In this position the gate 170 will hit and stop on the pressure housing 42 aligning the shear seal 142 with the supply port 22. The vent port 23 is now open and the supply port 22 is capped or closed by the shear seal 142. Function pressure will exit the valve 20 through the open vent port 23 and the associated header.

Mounted on the gate 171 is a seal carrier 141 which contains the shear seal 142. When the shear seal 142 is aligned with the supply port 22, supply pressure is feed through the shear seal 142 activating the radial seal 146 between the shear seal carrier 141 and the shear seal 142. Pressure acting on the differential area between the face of the shear seal 142 and the radial seal 146 will contain or block the supply, loading the gate 171 onto the opposing roller bearings 174 and tightening the seal between the shear seal 142 and the seal disk 111.

When the shear seal 142 is instead aligned with the vent port 23, supply pressure acting on the total shear seal radial area will force both the seal carrier 141 and the shear seal 142 against the seal disk 111 blocking the port. At this point there is nominal pressure inside the shear seal 142 so the roller bearings 174 will only receive the force generated by the seal carrier return spring 143.

Referring to FIGS. 2–3, if the hydraulic control valve 20 embodiment is one that includes a pressure switch or transmitter 150, the pressure switch or transmitter 150 will announce the presents of pressure via a signal when the valve 20 is opened. This signal can be used to verify the valve 20 has functioned properly and the desired subsea function has been activated. In addition the hydraulic control valve 20 may contain a check valve 202, such as one including conical valve seal 204 in the function coupler assembly 200 that, for example, is mechanically opened when in contact with the mating coupler C on the fixed base B. This check valve 202 will limit sea water ingression during installation or removal of the valve package or module 221.

An embodiment of the present invention advantageously provides a method for assembling a hydraulic control valve 20. The method includes inserting a gate assembly 170 through a distal end 176 of a pressure housing 42, and attaching a seal disk 111 through an aperture or bore 118 for in the pressure housing 42 to interface with the shear seal 142. In an embodiment, the gate assembly 170 includes a roller bearing assembly 172, a gate 171, a seal carrier 141, a sealed carrier return spring 143 biased with respect to the gate 171, and a shear seal 142. In an embodiment, the method includes connecting the distal bore 130 of the pressure housing 42 with the proximal end 133 of the spring housing 43 so as the gate assembly 170 engages, or abuts, a spring adapter 104 located within the spring housing 43. In an embodiment, the method further includes connecting a nonmagnetically responsive tube 65 to the proximal end 47 of the pressure housing 42, the tube 65 guidingly supporting a plunger or piston rod, 61. In an embodiment, the method further includes the steps of connecting a valve actuation assembly housing 41 to the proximal end 47 of the pressure housing 42. In an embodiment, the method includes connecting a pressure transducer, or switch, 150 and a pressure transducer or switch cap 77 to the proximal end 66 of the nonmagnetic steel tube 65 to allow a sealed exit for a pressure transducer or switch conductor 152. An embodiment also includes connecting a proximal end 133 of a spring housing 43 to the distal bore 130 of the pressure housing 42.

Referring to FIG. 6, a method for assembling a hydraulic control valve system includes providing a hydraulic control valve mounting module housing 223 having at least one aperture or bore 227, shown schematically in FIG. 6, for receiving a hydraulic control valve body 21. The method also includes inserting the distal end 28 of the control valve 20 through the at least one aperture 227, shown schematically in FIG. 6, and threading a valve retainer 46, nut or rim, to the hydraulic control valve body 21. The hydraulic control valve body 21 is adapted to receive a valve retainer 46 (nut or rim). The valve retainer 46 is used to secure the hydraulic control valve 20 to the control valve mounting module housing 223. In an embodiment, the valve retainer 46 is threadedly secured to the gate return spring housing 43. In an embodiment, the method further includes directly latching the module 221 to the fixed base B with no further interface coupling required between the hydraulic control valve 20 and the fixed base male couples C.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification, and as defined in the appended claims

I claim:

1. A hydraulic control valve system comprising:
   a plurality of control valves, at least one of the valves including:
      a valve body, the body having a function port, a supply port to allow for the supply of a fluid to the function port, and a vent port to allow fluid to vent from the function port;
      a gate assembly including a gate, a seal assembly including a seal carrier slidably mounted within the gate, a shear seal to selectively direct hydraulic pressure, to and from, a subsea function by selectively alternating between a vent open-supply blocked position and a vent closed-supply unblocked position, a roller bearing assembly including a roller bearing engagement plate and an array of roller bearings interfaced with the roller bearing engagement plate and an actuation assembly for slidably moving the seal assembly;
   a removable hydraulic mounting module, including the plurality of control valves, an input-output module to interface the module to the actuation assembly, and a module housing; and
   a mounting assembly including a valve connector for connecting the valve to a mounting module, and an engagement assembly, the engagement assembly connecting the module to a fixed base having a function coupler, compensating for a separation force generated by supply pressure between the valve and the function coupler.

2. The hydraulic control valve system of claim 1, wherein the at least one valve includes only one shear seal for sealing both the supply port and the vent port.

3. The hydraulic control valve system of claim 1, wherein the actuation assembly of the valve includes a solenoid assembly.

4. The hydraulic control valve system of claim 1, wherein the control valve includes a female coupling assembly integral with the valve body.

5. The hydraulic control valve system of claim 1, wherein the engagement assembly includes a latch assembly, which releasably latches the removable hydraulic module to the fixed base.

6. The hydraulic control valve system of claim 1, including a pressure transmitter formed integral with the valve.

7. The hydraulic control valve system of claim 1, wherein a plurality of control valves are disposed in a pattern inside the module structure to connect them directly to the mating hydraulic coupler on the fixed base.

8. The hydraulic control valve system of claim 1, wherein the fixed base includes an array of male couplers.

9. The hydraulic control valve system of claim 1, wherein the input-output module comprises a program logic controller, the controller selectively controlling individual valve position.

10. The hydraulic control valve system of claim 1, wherein the input-output module comprises a multiplex controller, the controller selectively controlling individual valve position.

11. The hydraulic control valve system of claim 1, including an environmental seal, which contains a dielectric fluid within the mounting module and prevents seawater from entering a manifold.

12. The hydraulic control valve of claim 11, wherein the valve is capable of higher pressures equal to or exceeding 10,000 psi due to low friction resulting from using only one shear seal.

13. A hydraulic control valve comprising:
   a valve body, the valve body having a function port, a supply port to allow for the supply of fluid to the function port, a vent port to allow fluid to vent from the function port;
   a valve actuation assembly, including a plunger for moving a gate assembly between an supply port blocked position and a vent port blocked position;
   the gate assembly including a gate, and a seal assembly;
   the seal assembly including: a seal carrier slidably mounted within a gate, a shear seal to selectively direct hydraulic pressure to and from the subsea function by selectively alternating between a vent open-supply blocked position and a vent closed-supply unblocked position, the shear seal slidably mounted within the seal carrier; a seal carrier return spring, connected between the seal carrier and the gate; and
   a roller bearing assembly including a roller bearing engagement plate, and,
   an array of roller bearings interfaced with the roller bearing engagement plate.

14. The hydraulic control valve of claims 13, wherein the valve includes only one shear seal for sealing both the supply port and the vent port.

15. The hydraulic control valve of claim 14, wherein the shear seal is capable of a sealing face surface area no greater than an approximately 0.075 square inch area due to low friction resulting from using only one seal.

16. A hydraulic control valve of claims 13, the valve body including a valve actuation assembly housing enclosing the valve actuation assembly; a pressure housing enclosing the seal assembly; and a spring housing enclosing a gate return spring assembly and a function coupler assembly.

17. The hydraulic control valve of claim 13, the valve further comprising a hydraulic pressure coupling assembly including a seal disk hydraulically connected to hydraulic lines.

18. The hydraulic control valve of claim 17, wherein the seal disk is capable of a porting size no greater than an approximately 0.0048 square inch area while still complying with MMS regulations due to low friction resulting from using only one seal.

19. The hydraulic control valve of claim 13, the valve further comprising an internal valve cavity used as both a pressure and a vent chamber depending upon the valve position.

20. The hydraulic control valve of claim 19, the valve further comprising a pressure transmitter integral to the valve and in hydraulic communication with the internal valve cavity.

21. The hydraulic control valve of claim 20, including a conductor aperture for allowing conductors to exit the valve body, and a conductor arrangement wherein a position of the pressure transmitter allows for routing electrically conductive pressure transmitter conductors and electrically conductive actuating conductors through the same aperture.

22. The hydraulic control valve of claim 13, including a gate return spring assembly, which includes a gate return spring having a proximal and distal end, the spring connected to the spring housing on the distal end, and a spring adapter, the spring adapter connected to the proximal end of the gate return spring, wherein the gate return spring assembly returns the gate to the vent open-supply blocked position when the actuating assembly is not energized.

23. The hydraulic control valve of claim 13, including a function coupler interface assembly integral with the control valve.

24. The hydraulic control valve of claim 23, wherein the function coupler interface assembly includes a female mating hydraulic coupler assembly for matingly connecting with a male coupling associated with a fixed module base.

25. The hydraulic control valve of claim 13, including an environmental seal.

26. The hydraulic control valve of claim 13 wherein the valve body has a valve retainer to secure the valve body within a manifold.

27. The hydraulic control valve of claim 26 wherein the valve retainer is threaded.

* * * * *